US009777963B2

(12) United States Patent
Martinez et al.

(10) Patent No.: US 9,777,963 B2
(45) Date of Patent: Oct. 3, 2017

(54) METHOD AND SYSTEM FOR RADIAL TUBULAR HEAT EXCHANGERS

(71) Applicant: General Electric Company, Schenectady, NY (US)

(72) Inventors: Ramon Martinez, Fairfield, OH (US); Benjamin Paul Breig, Liberty Township, OH (US); Keith Alan Joerger, Brookville, IN (US); Gregg Hunt Wilson, Cincinnati, OH (US); Matthew John Hunt, Liberty Township, OH (US); Donald Michael Corsmeier, West Chester, OH (US); Paul Charles Johnson, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 334 days.

(21) Appl. No.: 14/713,363

(22) Filed: May 15, 2015

(65) Prior Publication Data
US 2016/0201989 A1 Jul. 14, 2016

Related U.S. Application Data

(60) Provisional application No. 62/019,171, filed on Jun. 30, 2014.

(51) Int. Cl.
*F02C 7/12* (2006.01)
*F28D 1/047* (2006.01)
(Continued)

(52) U.S. Cl.
CPC ............ *F28D 1/0477* (2013.01); *B23P 15/26* (2013.01); *F02C 7/14* (2013.01); *F02C 7/18* (2013.01);
(Continued)

(58) Field of Classification Search
CPC .... B23P 15/26; F02C 7/14; F02C 7/18; F02K 3/06; F05D 2250/185; F05D 2260/213;
(Continued)

(56) References Cited

U.S. PATENT DOCUMENTS 2,479,071 A 8/1949 Henstridge
3,528,250 A 9/1970 Johnson
(Continued)

FOREIGN PATENT DOCUMENTS

CA 2415536 A1 6/2004
DE 102005049067 A1 4/2007
(Continued)

OTHER PUBLICATIONS

European Search Report and Opinion issued in connection with Related EP Application No. 16159798.4 on Aug. 30, 2016.
(Continued)

*Primary Examiner* — Jesse Bogue
(74) *Attorney, Agent, or Firm* — Pamela A. Kachur (57) ABSTRACT

A method and a system for a heat exchanger assembly are provided. The heat exchanger assembly includes one or more arcuate heat exchanger segments each including an inlet header configured to extend circumferentially about a circumference of an inner surface of a fluid flow duct, and an outlet header configured to extend circumferentially about the fluid flow duct. The heat exchanger assembly also includes a first serpentine heat exchanger tube extending between the inlet header and the outlet header and including a series of flow path segments having a gradually changing direction defined by a bend radius of the tube such that a direction of flow through the serpentine heat exchanger tube reverses between the inlet and the outlet headers and a second serpentine heat exchanger tube extending between the inlet header and the outlet header, the second serpentine
(Continued)

heat exchanger tube co-planar with the first serpentine heat exchanger tube.

20 Claims, 10 Drawing Sheets

(51) Int. Cl.
| | |
|---|---|
| *B23P 15/26* | (2006.01) |
| *F02C 7/14* | (2006.01) |
| *F02C 7/18* | (2006.01) |
| *F28F 9/02* | (2006.01) |
| *F28D 7/08* | (2006.01) |
| *F02K 3/06* | (2006.01) |
| *F28D 21/00* | (2006.01) |

(52) U.S. Cl.
CPC ............ *F02K 3/06* (2013.01); *F28D 7/082* (2013.01); *F28F 9/0224* (2013.01); *F05D 2250/185* (2013.01); *F05D 2260/213* (2013.01); *F28D 2021/0021* (2013.01); *Y02T 50/671* (2013.01); *Y02T 50/675* (2013.01)

(58) Field of Classification Search
CPC ........... F28D 1/0477; F28D 2021/0021; F28D 7/082; F28F 9/0224; Y02T 50/671; Y02T 50/675
See application file for complete search history.

(56) References Cited

U.S. PATENT DOCUMENTS

| | | | | |
|---|---|---|---|---|
| 3,735,588 | A | * | 5/1973 | Moskowitz ............... F28D 7/08 165/135 |
| 4,137,705 | A | * | 2/1979 | Andersen ................. F02C 7/14 60/39.08 |
| 4,246,959 | A | | 1/1981 | Byrne |
| 4,638,857 | A | * | 1/1987 | Fournier ............... F22B 37/202 122/510 |
| 4,785,879 | A | | 11/1988 | Longsworth et al. |
| 4,854,380 | A | | 8/1989 | Yoshida et al. |
| 4,880,055 | A | | 11/1989 | Niggemann et al. |
| 5,033,542 | A | | 7/1991 | Jabs |
| 5,123,242 | A | | 6/1992 | Miller |
| 5,243,815 | A | | 9/1993 | Maier et al. |
| 5,363,654 | A | | 11/1994 | Lee |
| 5,511,613 | A | | 4/1996 | Mohn et al. |
| 5,775,412 | A | | 7/1998 | Montestruc, III et al. |
| 6,422,306 | B1 | | 7/2002 | Tomlinson et al. |
| 6,945,320 | B2 | | 9/2005 | Harvard, Jr. et al. |
| 7,255,159 | B2 | | 8/2007 | Sagasser et al. |
| 7,343,965 | B2 | | 3/2008 | Memory et al. |
| 7,377,100 | B2 | * | 5/2008 | Bruno ................... F01D 25/12 60/266 |
| 7,784,528 | B2 | | 8/2010 | Ottow et al. |
| 7,861,512 | B2 | | 1/2011 | Olver et al. |
| 8,266,888 | B2 | | 9/2012 | Liu |
| 8,266,889 | B2 | | 9/2012 | Coffinberry |
| 8,381,803 | B2 | | 2/2013 | Kim et al. |
| 8,708,036 | B2 | | 4/2014 | Ikeda |
| 8,826,970 | B2 | | 9/2014 | Shiraichi et al. |
| 9,249,730 | B2 | * | 2/2016 | Bourassa ................ F02C 7/185 |
| 2002/0005275 | A1 | | 1/2002 | O'Donnell et al. |
| 2003/0131978 | A1 | | 7/2003 | Nakano |
| 2004/0069470 | A1 | * | 4/2004 | Gorbulsky ............ F28D 1/0477 165/158 |
| 2005/0150970 | A1 | | 7/2005 | Beutin et al. |
| 2008/0095611 | A1 | | 4/2008 | Storage et al. |
| 2013/0020047 | A1 | | 1/2013 | Army, Jr. et al. |
| 2013/0180696 | A1 | | 7/2013 | Magee et al. |
| 2014/0027099 | A1 | | 1/2014 | Sispera et al. |
| 2014/0116664 | A1 | | 5/2014 | Landre |
| 2014/0208768 | A1 | | 7/2014 | Bacic |
| 2015/0377135 | A1 | * | 12/2015 | Kupiszewski ........... F02C 3/04 60/806 |

FOREIGN PATENT DOCUMENTS

| | | |
|---|---|---|
| EP | 0777094 A2 | 6/1997 |
| EP | 1555406 A1 | 7/2005 |
| EP | 2088371 A2 | 8/2009 |
| EP | 2711652 A1 | 3/2014 |
| EP | 2735791 A1 | 5/2014 |
| EP | 2811249 A1 | 12/2014 |
| ES | 2158731 T3 | 9/2001 |
| GB | 400557 A | 10/1933 |
| GB | 2217828 A | 11/1989 |
| JP | 11325753 A | 11/1999 |
| JP | 2003166792 A | 6/2003 |
| JP | 2004037020 A | 2/2004 |
| JP | 2006002622 A | 1/2006 |
| JP | 2012117544 A | 6/2012 |
| JP | 2014025695 A | 2/2014 |

OTHER PUBLICATIONS

GE Related Case Form.
European Search Report and Opinion issued in connection with corresponding EP Application No. 15173911.7 on Nov. 30, 2015.
European Search Report and Opinion issued in connection with corresponding EP Application No. 15173866.3 on Dec. 11, 2015.
Thomas Kupiszewski, Jun. 18, 2015, U.S. Appl. No. 14/742,970.
Unofficial English Translation of Japanese Office Action issued in connection with corresponding JP Application No. 2015128237 on Aug. 2, 2016.

* cited by examiner

METHOD AND SYSTEM FOR RADIAL TUBULAR HEAT EXCHANGERS

CROSS-REFERENCE TO RELATED APPLICATIONS

This non-provisional application claims the benefit of priority under 35 U.S.C. §119(e) to U.S. Provisional Patent Application No. 62/019,171, entitled "METHOD AND SYSTEM FOR RADIAL TUBULAR HEAT EXCHANGERS", filed Jun. 30, 2014, which is herein incorporated in its entirety by reference.

STATEMENT REGARDING FEDERALLY SPONSORED RESEARCH & DEVELOPMENT

The U.S. Government has certain rights in this application as provided for by the terms of Contract No. FA8650-09-D-2922.

BACKGROUND

This description relates to heat exchangers, and, more particularly, to a method and system for a radially-oriented circumferential heat exchanger.

Gas turbine engines typically include an inlet, a fan, low and high pressure compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as producing useful work to propel an aircraft in flight or to power a load, such as an electrical generator.

During engine operation, significant heat is produced which raises the temperature of engine systems to unacceptable levels. A lubrication system is utilized to facilitate lubricating components within the gas turbine engine. The lubrication system is configured to channel lubrication fluid to various bearing assemblies within the gas turbine engine. During operation, heat is transmitted to the lubrication fluid from heat generated by sliding and rolling friction by components like bearings and seals within the engine.

Gas turbine engines are often used in conjunction with other systems such as systems used in aircraft powered by the gas turbine engine. Some of these systems require cooling to remove heat for improved comfort or operability. For example, pressurized cabins of the aircraft often need to remove heat from air delivered from an engine bleed to the cabin for habitability and comfort.

To facilitate reducing the operational temperature of the aircraft fluids, such as, but not limited to lubrication fluid and bleed air, at least one known gas turbine engine utilizes a conventional heat exchanger that is disposed in the air stream channeled through the engine allowing air that passes through it to cool the fluid circulating within.

BRIEF DESCRIPTION

In one embodiment, a heat exchanger assembly includes one or more arcuate heat exchanger segments wherein each of the one or more heat exchanger segments includes an inlet header configured to extend circumferentially about at least a portion of a circumference of an inner surface of a fluid flow duct and an outlet header configured to extend circumferentially about the portion spaced axially apart from the inlet header in a direction of fluid flow through the fluid flow duct. The heat exchanger assembly also includes a first serpentine heat exchanger tube extending between the inlet header and the outlet header. The serpentine heat exchanger tube including a series of flow path segments having a gradually changing direction defined by a bend radius of the tube such that a direction of flow through the serpentine heat exchanger tube reverses between the inlet and the outlet headers, and a second serpentine heat exchanger tube extending between the inlet header and the outlet header, the second serpentine heat exchanger tube being co-planar with the first serpentine heat exchanger tube.

In another embodiment, a method of assembling a modular radial tubular heat exchanger includes forming one or more arcuate heat exchanger segments wherein each heat exchanger segment is formed by coupling first ends of a plurality of serpentine heat exchanger tubes to a first header to partially form a heat exchanger segment assembly, the heat exchanger tubes arranged in groups of co-planar heat exchanger tubes and coupling second ends of the plurality of serpentine heat exchanger tubes to a second header to form the heat exchanger segment. The method further includes coupling each of the one or more heat exchanger segments to an inner surface of a fluid flow duct, each of the one or more heat exchanger segments axially aligned with two rows of apertures extending through the fluid flow duct, each row of apertures including a plurality of circumferentially-spaced apertures.

In yet another embodiment, gas turbine engine includes a core gas turbine engine having an axis of rotation, a fan casing substantially circumscribing the core gas turbine engine, and a heat exchanger assembly positioned within the fan casing. The heat exchanger assembly includes a one or more arcuate heat exchanger segments wherein each of the one or more heat exchanger segments includes an inlet header configured to extend circumferentially about at least a portion of a circumference of an inner surface of a fluid flow duct and an outlet header configured to extend circumferentially about the portion spaced axially apart from the inlet header in a direction of fluid flow through the fluid flow duct. The heat exchanger assembly also includes a first serpentine heat exchanger tube extending between the inlet header and the outlet header wherein the serpentine heat exchanger tube includes a series of flow path segments having a gradually changing direction defined by a bend radius of the tube such that a direction of flow through the serpentine heat exchanger tube reverses between the inlet and the outlet headers. The heat exchanger assembly further includes a second serpentine heat exchanger tube extending between the inlet header and the outlet header, the second serpentine heat exchanger tube co-planar with the first serpentine heat exchanger tube.

BRIEF DESCRIPTION OF THE DRAWINGS

FIGS. 1-10 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to analytical and methodical embodiments of heat management using radial tubular heat exchangers configured to operate within a duct, pipe, fluid flow path, or other fluid conduit.

Embodiments of the disclosure provide a lightweight and conformal heat exchanger solution integrated to the bypass duct assembly. Other embodiments provide for a heat exchanger mounted within any flow path, such as, but not limited to exhaust streams, ducts, piping, vessels, or tanks. A mounting plate arrangement provides a pocket cavity to distribute fluid fed from an integral plenum into the individual tubular serpentine arrangements for heat exchange. A bolted and sealed plate arrangement allows modular assembly of the heat exchanger units and modular manufacturing of the brazed tube joints. A serpentine configuration packages tubes in series with variable bend ratios to allow a co-planar tube arrangement that minimizes both internal and external pressure drops.

The configuration distributes incoming fluid into a pocket plenum plate bolted to the bypass duct by a series of holes distributed around a bypass duct. The pocket plenum plate is sealed to minimize system fluid leakage and distributes the fluid to the individual radial tubular serpentine arrangements. The variable tube bending arrangement allows multiple tubes to be packaged on the same plane and preserves tube wall to tube wall spacing. A second pocket plenum plate extracts and combines the fluid downstream of the serpentine.

The radial tubular duct heat exchanger design permits efficient integration of a heat exchanger serpentine arrangement into an existing bypass duct. The bypass duct's existing structure serves as a heat exchanger distribution header and manifold. The dual function of the bypass duct eliminates the need for redundant headers on the heat exchanger. This results in weight savings and frees up space for additional heat exchange area or minimizes heat exchanger volume. The modular nature of the design allows manufacturing of the braze joints in separate modules which then become bolted to the entire assembly.

The following description refers to the accompanying drawings, in which, in the absence of a contrary representation, the same numbers in different drawings represent similar elements.

Figure 1:
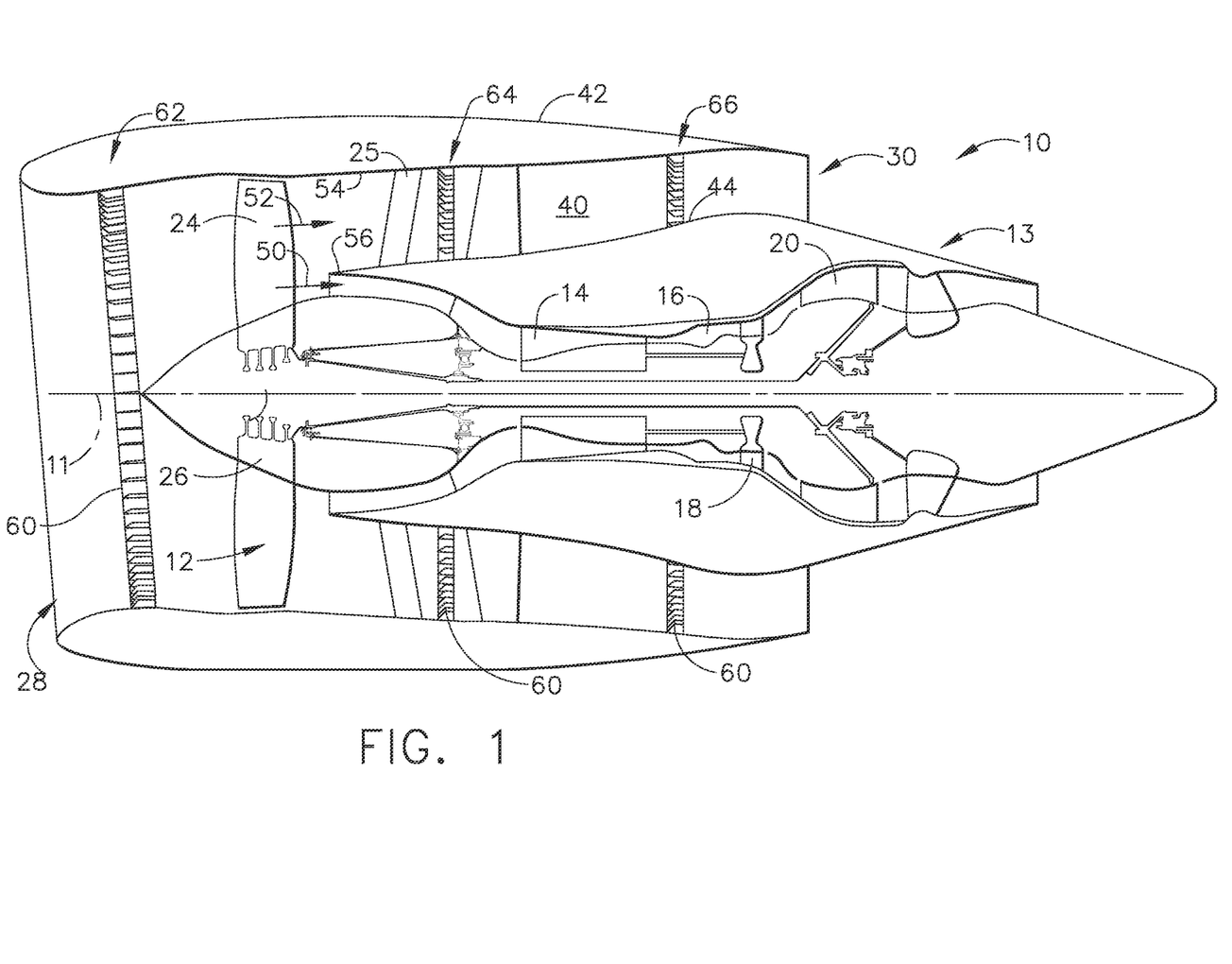
FIG. 1 is a schematic illustration of an exemplary gas turbine engine assembly having a longitudinal axis.

FIG. 1 is a schematic illustration of an exemplary gas turbine engine assembly 10 having a longitudinal axis 11. Gas turbine engine assembly 10 includes a fan assembly 12, and a core gas turbine engine 13. Core gas turbine engine includes a high pressure compressor 14, a combustor 16, and a high pressure turbine 18. In the exemplary embodiment, gas turbine engine assembly 10 may also include a low pressure turbine 20. Fan assembly 12 includes an array of fan blades 24 extending radially outward from a rotor disk 26. Engine 10 has an intake side 28 and an exhaust side 30.

In operation, air flows through fan assembly 12 and is split by an airflow splitter 44 into a first portion 50 and a second portion 52. First portion 50 of the airflow is channeled through compressor 14 wherein the airflow is further compressed and delivered to combustor 16. Hot products of combustion (not shown in FIG. 1) from combustor 16 are utilized to drive turbines 18 and 20 and thus produce engine thrust. Gas turbine engine assembly 10 also includes a bypass duct 40 that is utilized to bypass second portion 52 of the airflow discharged from fan assembly 12 around core gas turbine engine 13. More specifically, bypass duct 40 extends between an inner wall 54 of a fan casing or shroud 42 and an outer wall 56 of flow splitter 44.

In the example embodiment, bypass duct 40 includes one or more radial tubular duct heat exchangers 60 that may be positioned in a forward position 62 in gas turbine engine assembly 10, a mid-position 64 in gas turbine engine assembly 10, or an aft position 66 in gas turbine engine assembly 10. In the example embodiment, heat exchanger 60 is configured as a counter-flow heat exchanger. In various other embodiments, heat exchanger 60 is configured as a parallel-flow heat exchanger.

Figure 2:
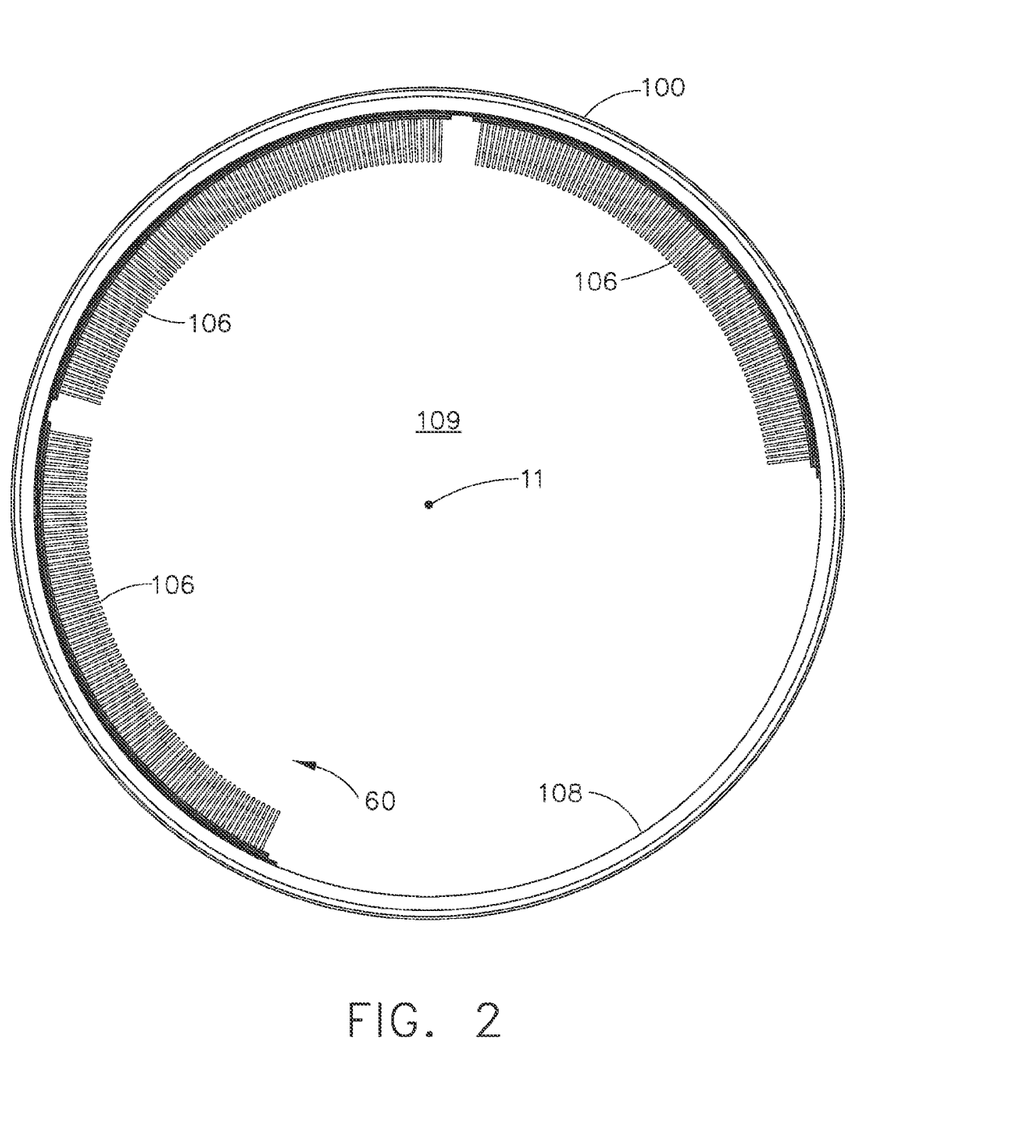
FIG. 2 is an axial view of an annular bypass duct.
Figure 3:
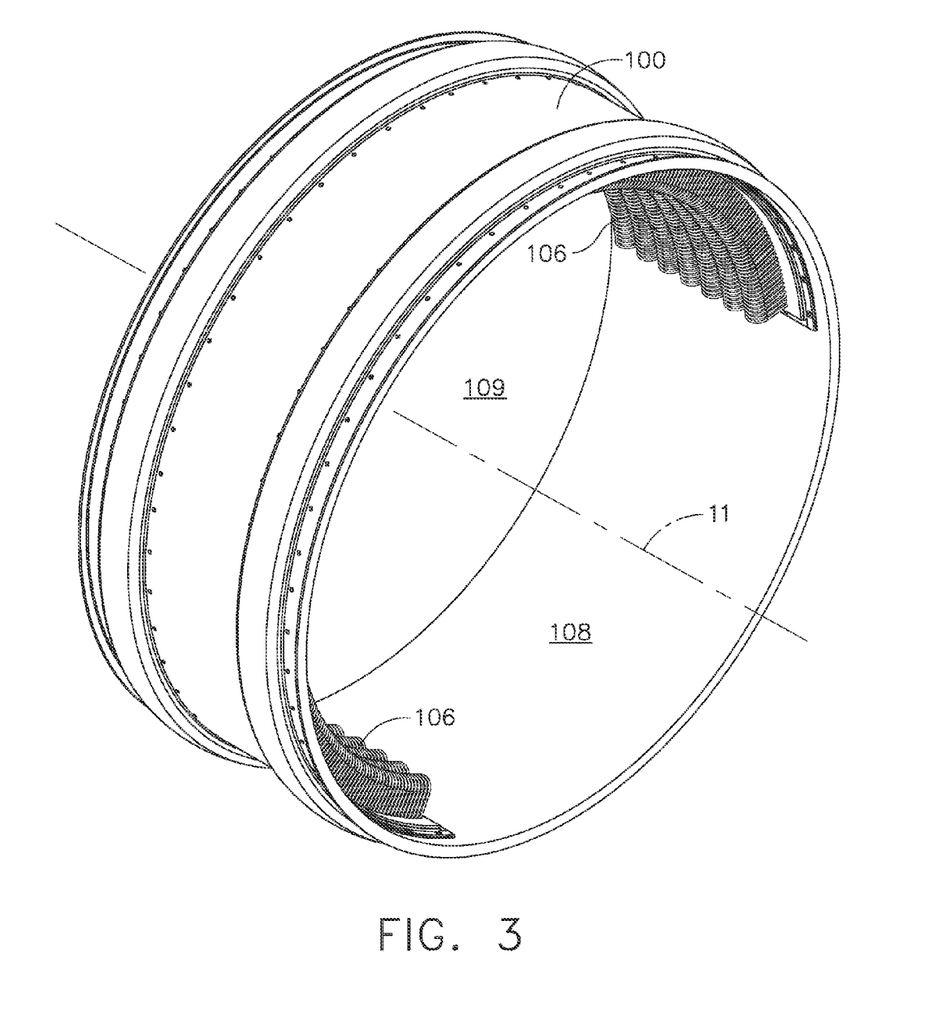
FIG. 3 is a perspective view of the annular bypass duct shown in FIG. 2.

FIG. 2 is an axial view of an annular bypass duct 100, such as, bypass duct 40 (shown in FIG. 1). FIG. 3 is a perspective view of annular bypass duct 100. In the example embodiment, annular bypass duct 100 includes longitudinal axis 11 that extends into and out of the paper in this perspective. Modular radial tubular duct heat exchanger 60 includes a plurality of heat exchanger segments 106 that extend circumferentially at least partially about an inner surface 108 of annular bypass duct 1000. A fluid flow path 109 extends axially through annular bypass duct 100.

Figure 4:
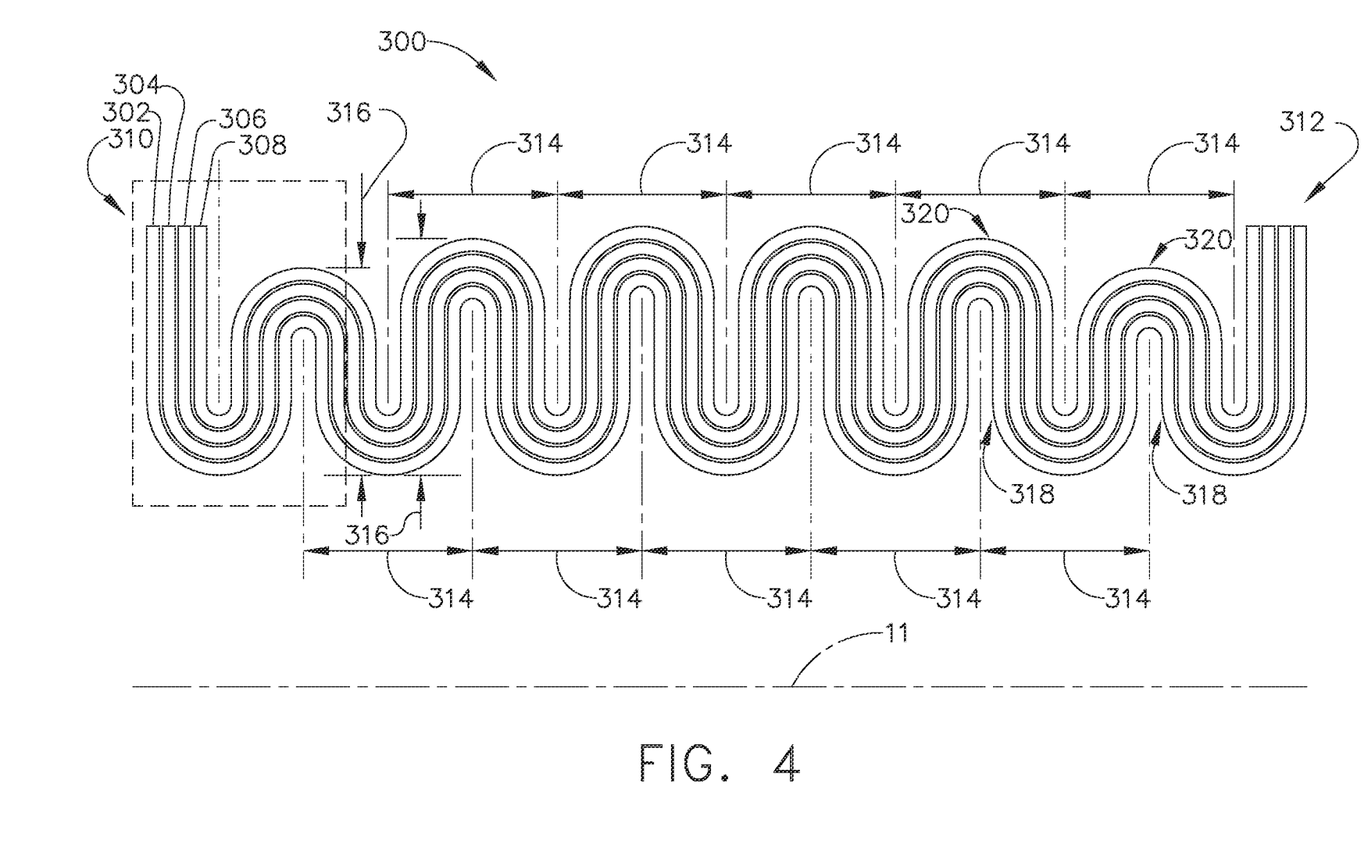
FIG. 4 is a view of a single tube group of heat exchanger segment shown in FIGS. 2 and 3.

FIG. 4 is a view of a single tube group 300 of heat exchanger segment 106 (shown in FIGS. 2 and 3). In the example embodiment, tube group 300 is illustrated with four individual tubes 302, 304, 306, and 308 for clarity. In various embodiments, tube group 300 can have any number of individual tubes nested together. Tubes 302, 304, 306, and 308 all lie in the same plane and extend from an upstream header end 310 to a downstream header end 312. Each of tubes 302, 304, 306, and 308 define a single flow duct from an upstream header (not shown in FIG. 4) to a downstream header (not shown in FIG. 4). Each of the defined flow ducts undulates along a serpentine duct. In the example embodiment, the undulations have a constant pitch from upstream header end 310 to downstream header end 312, meaning a distance 314 between undulations is approximately equal. In various embodiments, distance 314 varies between undulations. A height 316 of each undulation may vary from upstream header end 310 to downstream header end 312 as illustrated in FIG. 4, or all undulations may be of equal height. Moreover, each undulation is formed of at least one straight section 318 and one curved section 320. In the example embodiment, curved section 320 is curved 180° at a constant rate. In various embodiments, curved section 320 may not curve at a constant rate and may contain a straight section (not shown).

Figure 5:
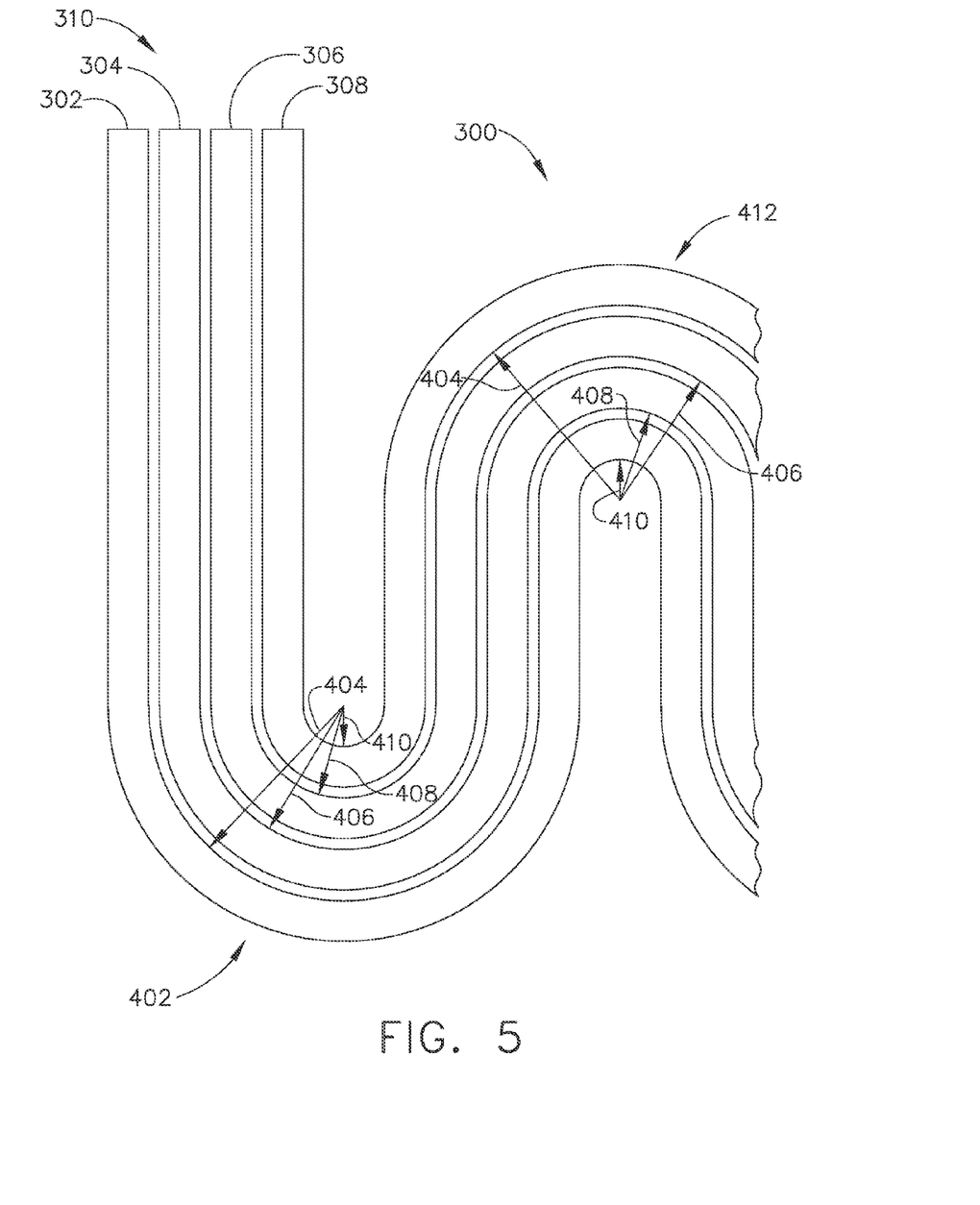
FIG. 5 is a view of a portion of single tube group of heat exchanger segment shown in FIGS. 2 and 3.

FIG. 5 is a view of a portion of single tube group 300 of heat exchanger segment 106 (shown in FIGS. 2 and 3). Because each of tubes 302, 304, 306, and 308 lie in the same plane, each of tubes 302, 304, 306, and 308 has a different bend radius at curved section 320 (shown in FIG. 4). For example, at a first undulation 402, tube 302 has a first bend radius 404, tube 304 has a second bend radius 406, tube 306 has a third bend radius 408, and tube 308 has a fourth bend radius 410. At first undulation 402, first bend radius 404 is greater than second bend radius 406, second bend radius 406 is greater than third bend radius 408, third bend radius 408 is greater than fourth bend radius 410. At a second undulation 412 tube 302 has fourth bend radius 410, tube 304 has third bend radius 408, tube 306 has second bend radius 406, and tube 308 has first bend radius 404.

Figure 6:
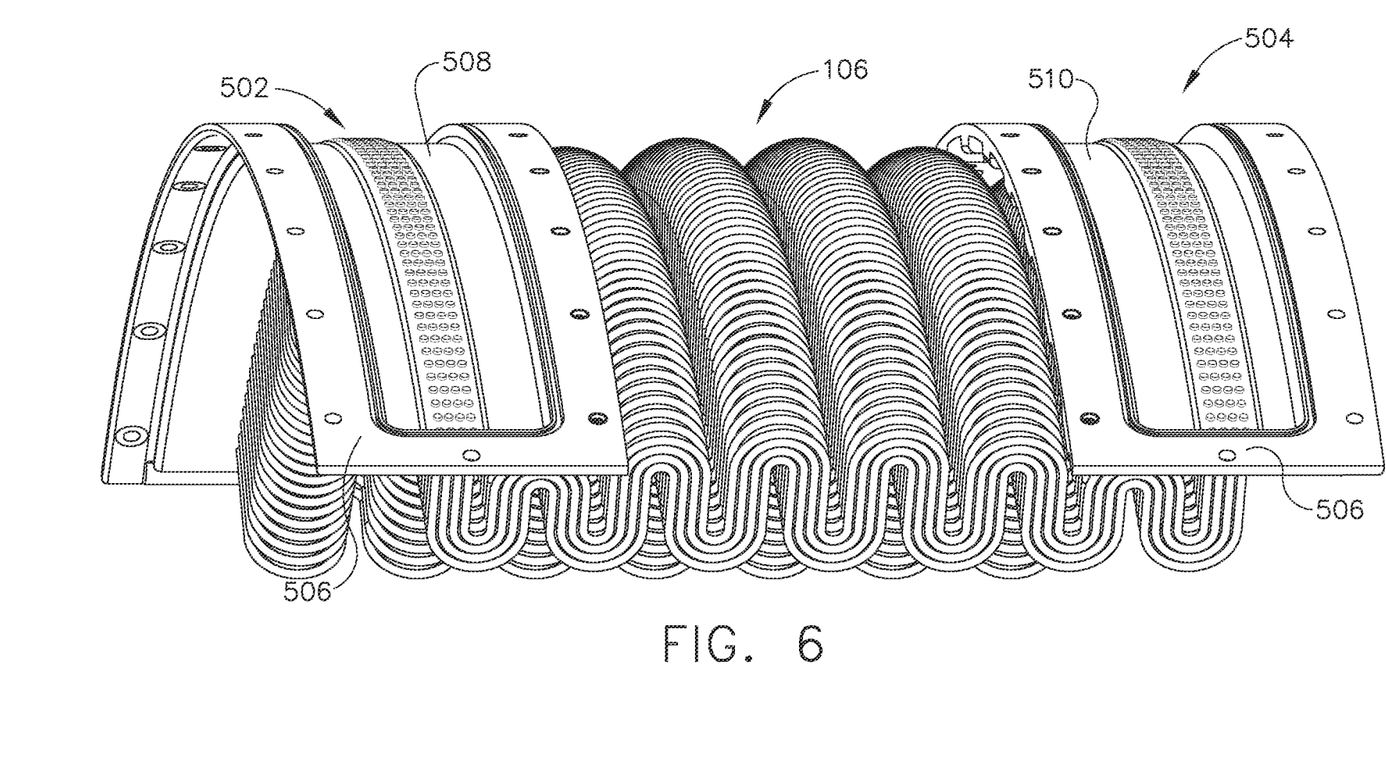
FIG. 6 is a perspective view of heat exchanger segment including a U-channel inlet header and a U-channel outlet header.

FIG. 6 is a perspective view of heat exchanger segment 106 including a U-channel outlet header 502 and a U-channel inlet header 504. Each of outlet header 502 and inlet header 504 include a flange 506 extending away from respective pocket plates 508, 510. Pocket plates 508, 510 function as headers in that they distribute fluid from an inlet to the plurality of tubes and collect fluid from the plurality of tubes and direct it to an outlet. Pocket plates 508, 510 also function as tubesheets where the plurality of tubes are coupled to form heat exchanger segment 106. Flanges 506 are configured to couple to inner surface 108 (shown in FIGS. 2 and 3). In operation, fluid enters outlet header 502 and is directed through tubes 302, 304, 306, and 308 and exits heat exchanger segment 106 through inlet header 504. Heat exchanger segment 106 is positioned within bypass duct 100 such that the plane in which tubes 302, 304, 306, and 308 lie extends radially from approximately inner circumference 108 into bypass duct 100.

Figure 7:
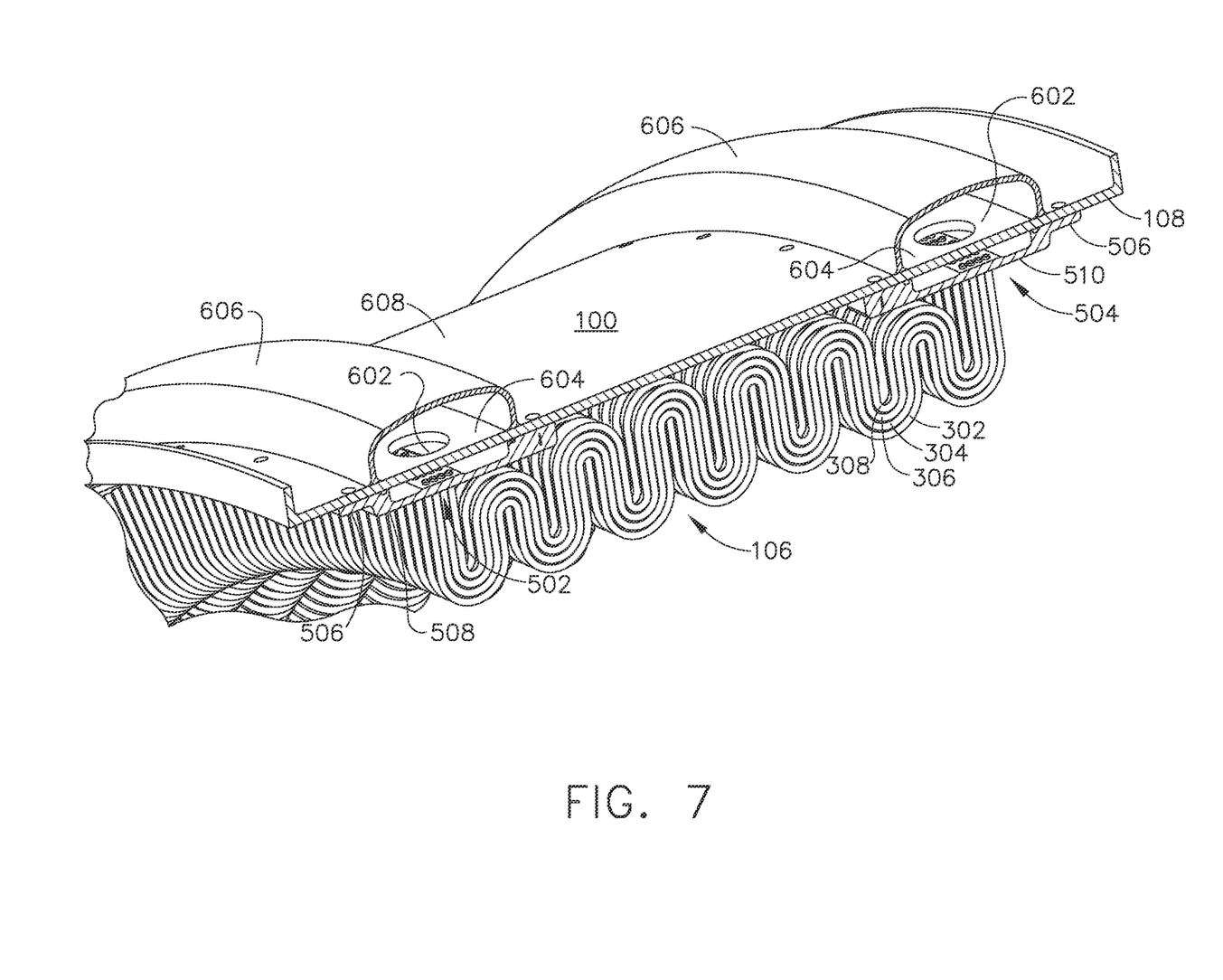
FIG. 7 is a perspective view of heat exchanger segment positioned within the bypass duct shown in FIG. 1.

FIG. 7 is a perspective view of heat exchanger segment 106 positioned within bypass duct 100. In the example embodiment, bypass duct 100 includes a plurality of circumferential apertures 602 therethrough. Apertures 602 are configured to permit fluid flow from an outer fluid channel 604 through apertures 602 and into outlet header 502 and inlet header 504. In the example embodiment, outer fluid channels 604 are formed of U-shaped channel members 606 coupled to an outer surface 608 of bypass duct 100.

Figure 8:
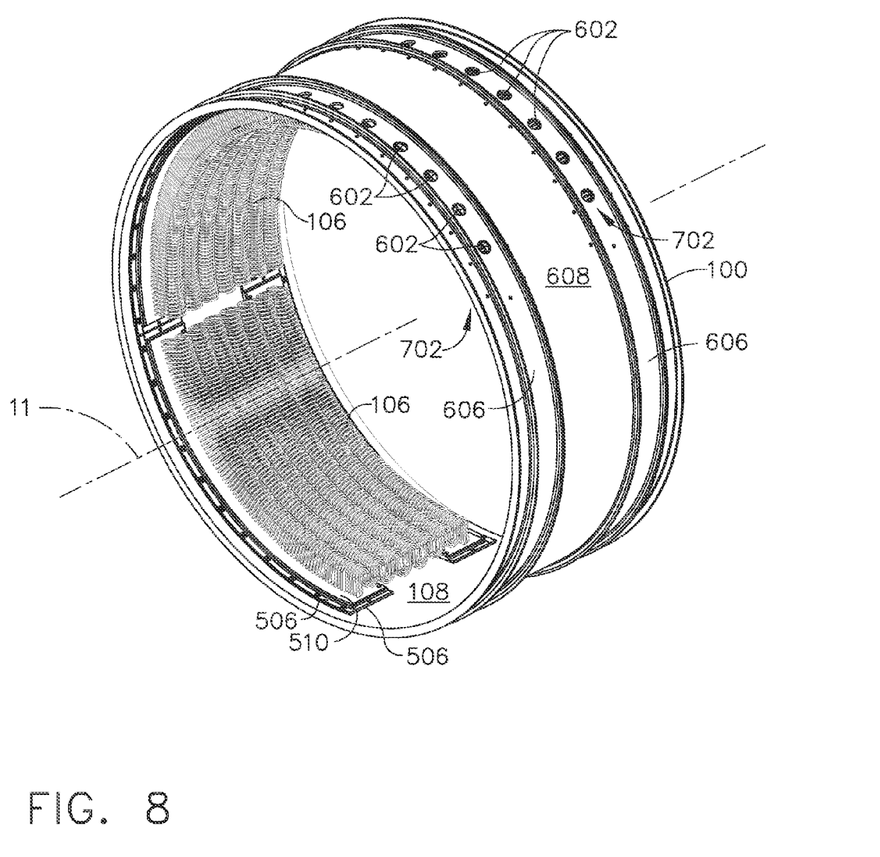
FIG. 8 is a perspective partial cut-away view illustrating a plurality of heat exchanger segments mounter within the bypass duct shown in FIG. 1.

FIG. 8 is a perspective partial cut-away view illustrating a plurality of heat exchanger segments mounted within bypass duct 100. In the example embodiment, two axially spaced-apart rows 702 of circumferentially-spaced apertures extend about bypass duct 100. A spacing of rows 702 corresponds to a length of heat exchanger segments in an axial direction. U-shaped channel members 606 are coupled to outer surface 608 of bypass duct 100 over apertures 602. Pocket plates 508 and 510 are detachably coupled to inner surface 108 of bypass duct 100. In the example embodiment, flanges 506 are illustrated as having bolt holes for facilitating detachably coupling pocket plates 508 and 510 to inner surface 108. However, any method of detachably coupling pocket plates 508 and 510 to inner surface 108 may be used.

Figure 9:
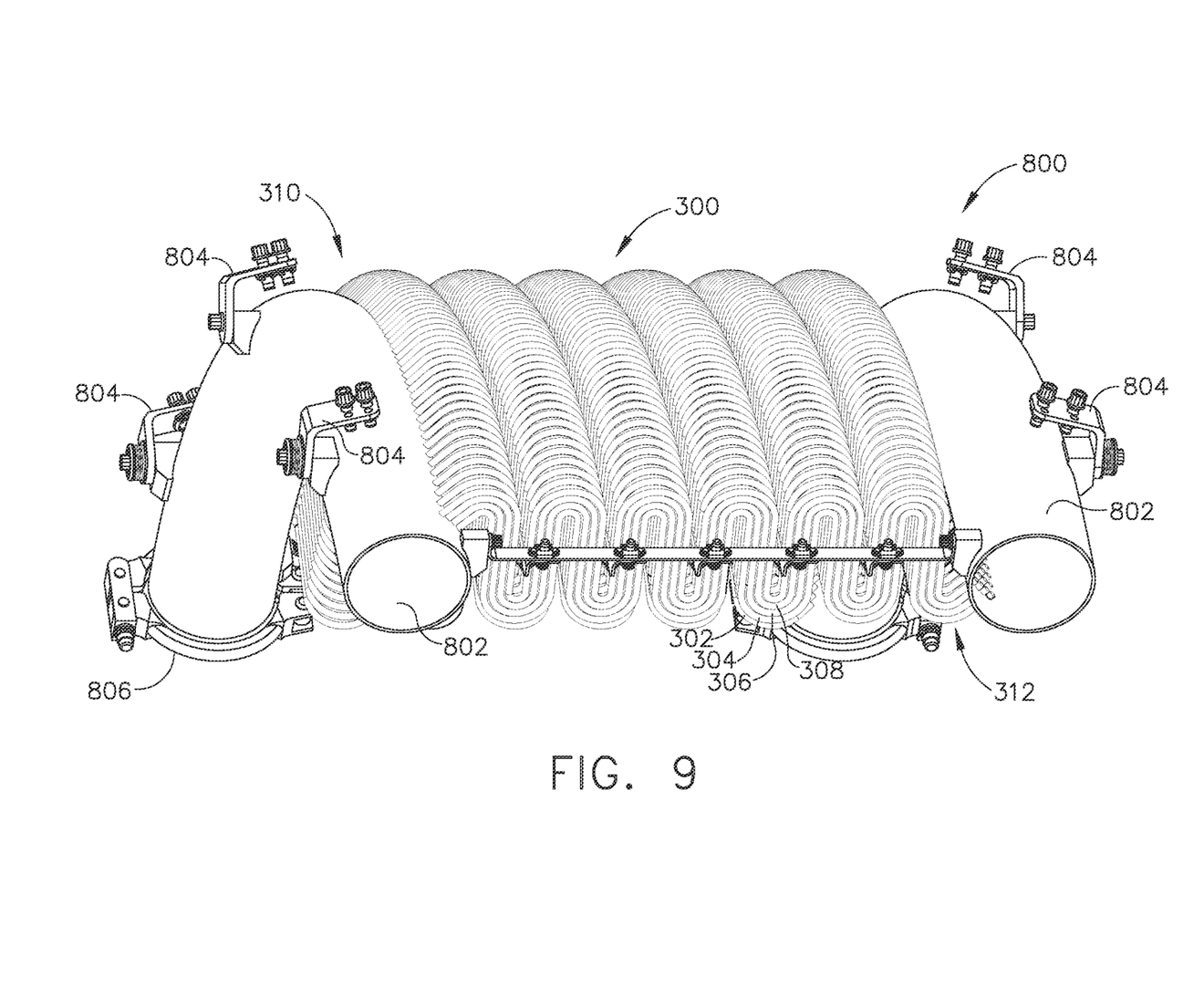
FIG. 9 is a perspective view of another embodiment of a heat exchanger segment that may be used with the bypass duct shown in FIG. 1.

FIG. 9 is a perspective view of another embodiment of a heat exchanger segment 800 that may be used with bypass duct 100 (shown in FIG. 2). In this example embodiment, heat exchanger segment 800 includes tubes 302, 304, 306, and 308 as described above. However, instead of coupling to a U-shaped channel that couples to inner surface 108 (shown in FIG. 2) of bypass duct 100, tubes 302, 304, 306, and 308 couple to a generally circular or toroidal cross-section OR toroidal header 802 at each of upstream header end 310 and downstream header end 312. Heat exchanger segment 800 is configured to be mounted entirely within bypass duct 100, using, for example, a plurality of mounting clips 804 spaced circumferentially about the generally circular or toroidal headers 802 and configured to couple to inner surface 108. Note that the inlet and outlet connections of heat exchanger segment 800 may protrude through the duct 100. Generally circular or toroidal headers 802 and single tube group 300 are positioned within bypass duct 100 as an integral unit and coupled together with at least one adjacent heat exchanger segment 800 using a complementary rigid coupling device 806 at each end of generally circular or toroidal headers 802. Specifically, each end of generally circular or toroidal header 802 includes, for example, a rolled groove or cut groove end configured to attach an end of adjacent general circular or toroidal headers 802 using a coupling device 806 that engages both grooves to couple them in close engagement to each other.

Figure 10:
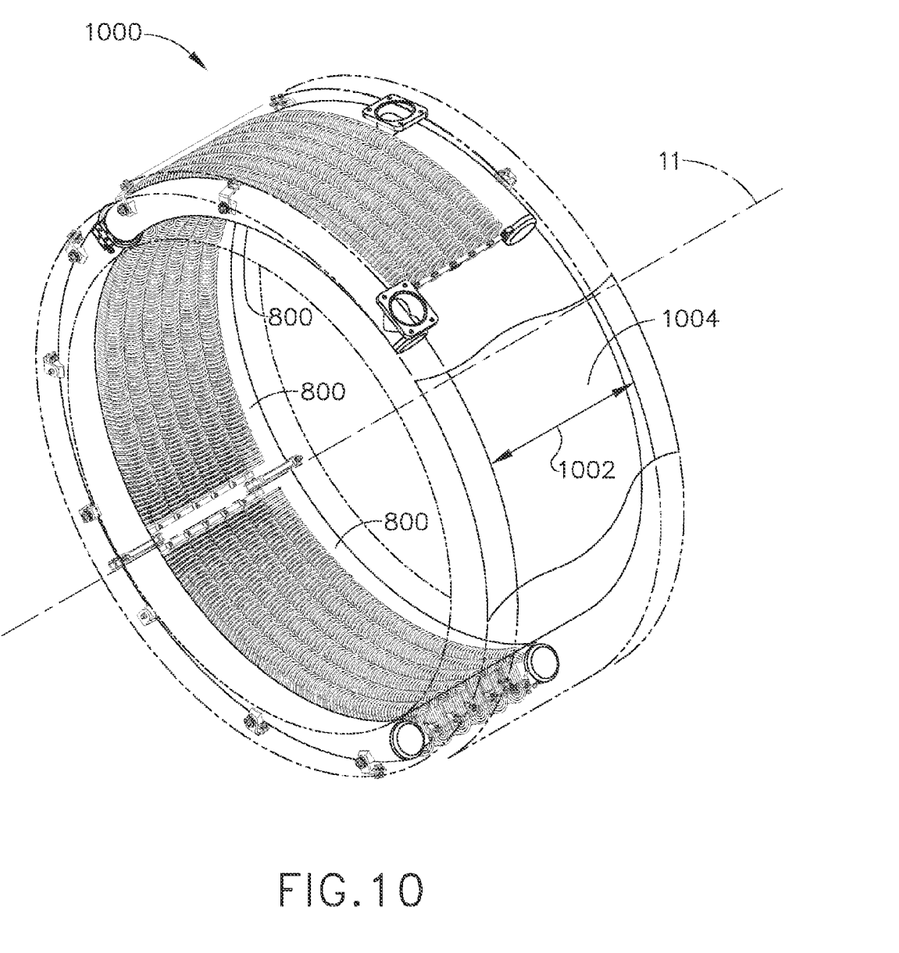
FIG. 10 is a perspective view of another embodiment of a bypass duct that may be used with the heat exchanger segments shown in FIG. 9 to form the radial tubular duct heat exchanger shown in FIG. 1.

FIG. 10 is a perspective view of another embodiment of a bypass duct 1000 that may be used with heat exchanger segments 800 to form radial tubular duct heat exchanger 60 (shown in FIG. 1). In this example embodiment, heat exchanger segments 800 as described above are positioned within bypass duct 1000 having a circumferentially "bumped-out" section 1002. Bumped-out section 1002 defines an axial span of bypass duct 1000 having an increased inner diameter (i.e. distance from longitudinal axis 11 to an inner surface (not shown) of bypass duct 1000). Consequently, bypass duct 1000 also has an increased outer diameter (i.e. distance from longitudinal axis 11 to an outer surface 1004 of bypass duct 1000). Bumped-out section 1002 permits installation of radial tubular duct heat exchanger 60 out of line of direct flow impingement in bypass duct 1000 in a recess of the inner surface (not shown) of bypass duct 1000. Such protection limits wear and erosion of surfaces of radial tubular duct heat exchanger 60.

The above described embodiments of radial tubular duct heat exchangers provides an overall system weight reduction versus comparable header and tube arrangement by elimination of the headers. The radial tubular duct heat exchanger permits packaging of a large surface area for heat exchange in a uniformly distributed fluid environment through the elimination of headers, which add blockage to the fluid environment. The radial tubular duct heat exchanger also permits individual component assembly, installation in a bypass duct, and removal from the bypass duct for improved producibility and maintainability on a modular heat exchanger system. The above described embodiments of radial tubular duct heat exchangers further provides improved packaging through the use of variable tube bends and co-planar tube assemblies.

It will be appreciated that the above embodiments that have been described in particular detail are merely example or possible embodiments, and that there are many other combinations, additions, or alternatives that may be included.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

While the disclosure has been described in terms of various specific embodiments, it will be recognized that the disclosure can be practiced with modification within the spirit and scope of the claims.

As used herein, serpentine refers to a flow duct segment wherein the direction is gradually partially reversed at least once in a U-like pattern, and usually multiple times in an undulating pattern. For example, the U-like pattern of channels at the section interfaces may be repeated multiple times in a single flow duct segment.

The above-described embodiments of a method and system for radial tubular duct heat exchangers provides a cost-effective and reliable means for reducing a weight of the heat exchanger. More specifically, the methods and systems described herein facilitate reducing the number of headers required to direct fluid flow into the heat exchanger tubes. In addition, the above-described methods and systems facilitate packaging of a large surface area for heat exchange in a uniformly distributed fluid environment through the elimination of headers. Moreover, the elimination of headers reduces blockage in the fluid environment. As a result, the methods and systems described herein facilitate improving heat exchanger performance and reducing costs associated with heat exchangers in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heat exchanger assembly comprising:
   one or more arcuate heat exchanger segments, each of the one or more heat exchanger segments comprising:
   an inlet header configured to extend circumferentially about at least a portion of a circumference of an inner surface of a fluid flow duct;
   an outlet header configured to extend circumferentially about at least a portion of the circumference of the inner surface of the fluid flow duct and spaced axially apart from said inlet header in a direction of fluid flow through the fluid flow duct;
   a first serpentine heat exchanger tube extending between said inlet header and said outlet header, the serpentine heat exchanger tube comprising a series of flow path segments having a gradually changing direction defined by a bend radius of the tube such that a direction of flow through said serpentine heat exchanger tube reverses between said inlet and said outlet headers; and
   a second serpentine heat exchanger tube extending between said inlet header and said outlet header, said second serpentine heat exchanger tube co-planar with said first serpentine heat exchanger tube.

2. The heat exchanger assembly of claim 1, wherein a first segment of said one or more arcuate heat exchanger segments is configured to be coupled to a second segment of said one or more arcuate heat exchanger segments.

3. The heat exchanger assembly of claim 1, wherein an end of said inlet header of a first segment of said one or more arcuate heat exchanger segments is configured to be coupled to a complementary end of said inlet header of a second segment of said one or more arcuate heat exchanger segments.

4. The heat exchanger assembly of claim 1, wherein an end of said outlet header of a first segment of said one or more arcuate heat exchanger segments is configured to be coupled to a complementary end of said outlet header of a second segment of said one or more arcuate heat exchanger segments.

5. The heat exchanger assembly of claim 1, wherein at least one of said inlet header and said outlet header comprises a generally circular manifold.

6. The heat exchanger assembly of claim 1, wherein at least one of said inlet header and said outlet header comprises a channel having a U-shaped cross-section, a first flange extending in a first axial direction, and a second flange extending in a second opposite axial direction.

7. The heat exchanger assembly of claim 6, wherein the one or more arcuate heat exchanger segments are configured to couple to an inner surface of the fluid flow duct using said flanges.

8. The heat exchanger assembly of claim 6, wherein the channel is configured to receive a flow of fluid from apertures extending through the fluid flow duct.

9. The heat exchanger assembly of claim 1, wherein the bend radius of the first serpentine heat exchanger tube is a different radius than the bend radius of the second serpentine heat exchanger tube to permit the first and second heat exchanger tubes to be nested in co-planar alignment.

10. A method of assembling a modular radial tubular heat exchanger, said method comprising:
    forming one or more arcuate heat exchanger segments, each heat exchanger segment formed by:
    coupling first ends of a one or more serpentine heat exchanger tubes to a first header to partially form a heat exchanger segment assembly, the heat exchanger tubes arranged in groups of co-planar heat exchanger tubes; and
    coupling second ends of the one or more serpentine heat exchanger tubes to a second header to form the heat exchanger segment; and
    coupling each of the one or more heat exchanger segments to an inner surface of a fluid flow duct, each of the one or more heat exchanger segments axially aligned with two rows of apertures extending through the fluid flow duct, each row of apertures including a plurality of circumferentially-spaced apertures.

11. The method of claim 10, wherein coupling first ends of a plurality of serpentine heat exchanger tubes to a first header comprises coupling first ends of a plurality of serpentine heat exchanger tubes to a first U-shaped pocket plate, the pocket plate comprising a flange circumscribing the pocket plate.

12. The method of claim 10, wherein coupling first ends of a plurality of serpentine heat exchanger tubes to a first header comprises coupling first ends of a plurality of serpentine heat exchanger tubes to a first generally circular piping header.

13. The method of claim 10, further comprising mounting each of the one or more heat exchanger segments individually to the inner surface of the fluid flow duct.

14. A gas turbine engine comprising:
a core gas turbine engine having an axis of rotation;
a fan casing substantially circumscribing said core gas turbine engine; and
a heat exchanger assembly positioned within said fan casing, said heat exchanger assembly comprising:
one or more arcuate heat exchanger segments, each of the one or more heat exchanger segments comprising:
an inlet header configured to extend circumferentially about at least a portion of a circumference of an inner surface of a fluid flow duct;
an outlet header configured to extend circumferentially about the portion spaced axially apart from said inlet header in a direction of fluid flow through the fluid flow duct;
a first serpentine heat exchanger tube extending between said inlet header and said outlet header, the serpentine heat exchanger tube comprising a series of flow path segments having a gradually changing direction defined by a bend radius of the tube such that a direction of flow through said serpentine heat exchanger tube reverses between said inlet and said outlet headers; and
a second serpentine heat exchanger tube extending between said inlet header and said outlet header, said second serpentine heat exchanger tube co-planar with said first serpentine heat exchanger tube.

15. The gas turbine engine of claim 14, wherein a first segment of said one or more arcuate heat exchanger segments is configured to be coupled to a second segment of said one or more arcuate heat exchanger segments.

16. The gas turbine engine of claim 14, wherein at least one of said inlet header and said outlet header comprises a generally circular manifold.

17. The gas turbine engine of claim 14, wherein at least one of said inlet header and said outlet header comprises a channel having a U-shaped cross-section, a first flange extending in a first axial direction, and a second flange extending in a second opposite axial direction.

18. The gas turbine engine of claim 17, wherein the one or more arcuate heat exchanger segments are configured to couple to an inner surface of the fluid flow duct using said flanges.

19. The gas turbine engine of claim 17, wherein the channel is configured to receive a flow of fluid from apertures extending through the fluid flow duct.

20. The gas turbine engine of claim 14, wherein the bend radius of the first serpentine heat exchanger tube is a different radius than the bend radius of the second serpentine heat exchanger tube to permit the first and second heat exchanger tubes to be nested in co-planar alignment.

* * * * *